United States Patent
Raichel et al.

(10) Patent No.: US 6,825,139 B2
(45) Date of Patent: Nov. 30, 2004

(54) POLY-CRYSTALLINE COMPOSITIONS

(75) Inventors: Alexander Raichel, Rishon Le'zion (IL); Svetlana Raichel, Rishon Le'zion (IL)

(73) Assignee: GlassCerax Ltd., Ashkelon (IL)

( * ) Notice: Subject to any disclaimer, the term of this patent is extended or adjusted under 35 U.S.C. 154(b) by 254 days.

(21) Appl. No.: 10/047,395

(22) Filed: Jan. 8, 2002

(65) Prior Publication Data

US 2002/0132722 A1 Sep. 19, 2002

Related U.S. Application Data

(60) Provisional application No. 60/259,901, filed on Jan. 8, 2001.

(51) Int. Cl.[7] .................................................. C03C 3/30
(52) U.S. Cl. ................................. 501/1; 501/4; 501/32; 501/53; 501/57; 501/68; 501/70; 501/73
(58) Field of Search ............................ 501/1, 4, 32, 53, 501/57, 68, 70, 73, 155

(56) References Cited

U.S. PATENT DOCUMENTS

| | | | |
|---|---|---|---|
| 3,969,122 A | | 7/1976 | Miller et al. |
| 4,065,281 A | * | 12/1977 | Bryne |
| 4,119,434 A | * | 10/1978 | Kroyer |
| 4,165,281 A | * | 8/1979 | Kuriyama et al. |
| 4,191,546 A | * | 3/1980 | Kroyer |
| 4,318,995 A | * | 3/1982 | Rhodes et al. |
| 4,430,108 A | | 2/1984 | Hojaji et al. |
| 4,764,487 A | * | 8/1988 | Lewis |
| 5,508,236 A | * | 4/1996 | Chiang et al. |
| 5,521,132 A | | 5/1996 | Talmy et al. |
| 5,583,079 A | | 12/1996 | Golitz et al. |
| 5,935,885 A | | 8/1999 | Hnat et al. |

FOREIGN PATENT DOCUMENTS

| | | | |
|---|---|---|---|
| FR | 2367027 | * | 6/1978 |
| GB | 1459178 | * | 12/1976 |
| GB | 2220654 | * | 1/1990 |
| JP | 57034047 | * | 7/1980 |
| JP | 57034048 | * | 2/1982 |
| WO | 91/03433 | * | 3/1991 |

OTHER PUBLICATIONS

English abstract of RU 2052400 published Jan. 1996.*
English abstractof JP 50–148415 published Nov. 1975.*

* cited by examiner

*Primary Examiner*—Archene Turner
(74) *Attorney, Agent, or Firm*—G. E.Ehrlich (1995) Ltd.

(57) ABSTRACT

The invention relates to a crystalline composition, a polycrystalline product and an article of manufacture comprising an amount of $SiO_2$, $Al_2O_3$, $CaO$, $Fe_2O_3$, $TiO_2$, $K_2O$, $P_2O_5$, $Cr_2O_3$, $ZnO$, $MgO$, $Na_2O$, $Li_2O$, $CeO_2$, $ZrO_2$ and $MnO_2$ and methods for preparation the same.

34 Claims, No Drawings

POLY-CRYSTALLINE COMPOSITIONS

This application claims priority from U.S. Provisional Application Ser. No. 60/259,901, filed Jan. 8, 2001, incorporated hereto by reference.

FIELD OF THE INVENTION

The present invention relates to poly-crystalline compositions, articles of manufacture and processes for producing same.

BACKGROUND OF THE INVENTION

Ash in the form of coal ash and of municipal solid waste coal ash is a major environmental problem. Coal ash represents an incombustible residual formed from mineral admixtures of coal upon its burning at heat power-stations. The quantity of ash depends on the coal composition and ranges from 5% to 13% of the fuel total. Industrial developed countries, which are producing considerable quantities of electric power, face the problem of accumulating huge quantities of coal ash waste.

Altogether, 20% of the coal ash is bottom ash heavy and light melting particles wherein 80% is coal ash, which has light, thin-dispersion particles.

In most countries, part of the coal ash is used in cement as a substitute for shale; in concrete as a substitute for cement and sand; in road construction as a filler to bitumen and in bricks as a substitute for clay. In spite of the above, large amount of the coal ash are not exploited.

U.S. Pat. No. 5,521,132 by Talmy et al., teaches a method of manufacturing ceramic materials on the base of ash from coal and solid municipal waste incineration, mixed with sodium tetraborate and a calcium containing material.

U.S. Pat. No. 5,583,079 by Golitz, et al., discloses a method of ceramic products obtained by mixing coal ash, glass and clay wastes.

U.S. Pat. No. 3,966,9122 to Miller et al., teaches a method of manufacturing of soda-lime glass containing coal ash.

U.S. Pat. No. 4,430,108 to Hojaji et al., teaches a method of manufacturing foam glass from diatomaceous and coal ash.

U.S Pat. No. 5,935,885 to Hnat et al., teaches a process for forming glass ceramic tiles.

However, the above mentioned inventions provide glass products, which have similar properties to those that are already exist in the market. Moreover, the high quantity of iron in the coal ash paints the glass materials in a black color, which limit their possible applications.

There is thus, a widely recognized need for cost effective processes and for products comprising of high amount of coal ashes. Moreover, it will be highly advantageous to have high quality glass poly-crystalline products e.g. high impact strength, high compressive strength, high bending strength high hardness, modulus of elasticity, thermal-resistance, high-temperature strength, wear-resistance, absence of porosity, zero water-absorption and gas-impermeability and low thermal conductivity.

SUMMARY OF THE INVENTION

In one embodiment, the invention provides a poly-crystalline composition comprising an amount of $SiO_2$, $Al_2O_3$, $CaO$, $Fe_2O_3$, $TiO_2$, $MgO$, $Na_2O$, $Li_2O$, $CeO_2$, $ZrO_2$, $K_2O$, $P_2O_5$, $Cr_2O_3$, $ZnO$ and $MnO_2$.

In another embodiment, the invention provides a process for producing a poly-crystalline composition comprising the steps of: mixing a coal ash particle with at least one glass forming agent and at least one crystallization catalyst; melting said coal ash particle, the at least one glass forming agent and the at least one crystallization catalyst to form a mixture; and cooling the resulting mixture to ambient temperature so as to form a homogenous, non-porous poly-crystalline product comprising $SiO_2$, $Al_2O_3$, $CaO$, $Fe_2O_3$, $TiO_2$, $MgO$, $Na_2O$, $Li_2O$, $CeO_2$, $ZrO_2$, $K_2O$, $P_2O_5$, $Cr_2O_3$, $ZnO$ and $MnO_2$.

In another embodiment, the invention provides an article of manufacture comprising $SiO_2$, $Al_2O_3$, $CaO$, $Fe_2O_3$, $TiO_2$, $MgO$, $Na_2O$, $Li_2O$, $CeO_2$, $ZrO_2$, $K_2O$, $P_2O_5$, $Cr_2O_3$, $ZnO$ and $MnO_2$.

In another embodiment, the invention provides a poly-crystalline product comprising an amount of $SiO_2$, $Al_2O_3$, $CaO$, $Fe_2O_3$, $TiO_2$, $MgO$, $Na_2O$, $Li_2O$, $CeO_2$, $ZrO_2$, $K_2O$, $P_2O_5$, $Cr_2O_3$, $ZnO$ and $MnO_2$.

In another embodiment, the invention provides a poly-crystalline product that is produced by a process comprising the steps of: a. mixing coal ash particle with at least one glass forming agent and at least one crystallization catalyst; b. melting the coal ash particle, the at least one glass forming agent and the at least one crystallization catalyst to form a mixture; and c. cooling the resulting mixture to ambient temperature to form a homogenous, non-porous microcrystalline composition comprising $SiO_2$, $Al_2O_3$, $CaO$, $Fe_2O_3$, $TiO_2$, $MgO$, $Na_2O$, $Li_2O$, $CeO_2$, $ZrO_2$, $K_2O$, $P_2O_5$, $Cr_2O_3$, $ZnO$ and $MnO_2$.

This invention provides a poly-crystalline composition, poly-crystalline product and an article of manufacture which further comprising an amount of 35.0–43.0 percent of $SiO_2$, 29.0–36.0 percent of $Al_2O_3$, 1.4–4.1 percent of $Fe_2O_3$, 16.0–21.0 percent of $CaO$, 1.3–15.2 percent of $TiO_2$, 0.6–8.9 percent of $K_2O$, 1.4–6.8 percent of $P_2O_5$, 0–6.0 percent of $Cr_2O_3$, 0–11.2 percent of $ZnO$, 0–1.5 percent of $MnO_2$, 0–10.0 percent of $MgO$, 0–10.2 percent of $Na_2O$, 0–5.0 percent of $CeO_2$, 0–5.0 percent of $ZrO_2$ and 0–10.2 percent of $Li_2O$ by weight.

In another embodiment the invention provides a poly-crystalline composition, poly-crystalline product and an article of manufacture which further comprising an amount of 35.0–57.0 percent of $SiO_2$, 15.0–36.0 percent of $Al_2O_3$, 1.4–10.0 percent of $Fe_2O_3$, 15.0–22.0 percent of $CaO$, 0.6.–15.2 percent of $TiO_2$, 0.3–11.0 percent of $K_2O$, 1.4–6.8 percent of $P_2O_5$, 0–6.0 percent of $Cr_2O_3$, 0–11.2 percent of $ZnO$, 0–11.5 percent of $MnO_2$, 0–10.0 percent of $MgO$, 0–10.2 percent of $Na_2O$, 0–5.0 percent of $CeO_2$, 0–5.0 percent of $ZrO_2$ and 0–10.2 percent of $Li_2O$ by weight.

In another embodiment, in step C, the microcrystalline composition further comprising an amount of 35.0–43.0 percent of $SiO_2$, 29.0–36.0 percent of $Al_2O_3$, 1.4–4.1 percent of $Fe_2O_3$, 16.0–21.0 percent of $CaO$, 1.3–15.2 percent of $TiO_2$, 0.6–8.9 percent of $K_2O$, 1.4–6.8 percent of $P_2O_5$, 0–6.0 percent of $Cr_2O_3$, 0–11.2 percent of $ZnO$, 0–1.5 percent of $MnO_2$, 0–10.0 percent of $MgO$, 0–10.2 percent of $Na_2O$, 0–5.0 percent of $CeO_2$, 0–5.0 percent of $ZrO_2$ and 0–10.2 percent of $Li_2O$ by weight.

In another embodiment, in step C, the microcrystalline composition further comprising an amount of 35.0–57.0 percent of $SiO_2$, 15.0–36.0 percent of $Al_2O_3$, 1.4–10.0 percent of $Fe_2O_3$, 15.0–22.0 percent of $CaO$, 0.6–15.2 percent of $TiO_2$, 0.3–11.0 percent of $K_2O$, 1.4–6.8 percent of $P_2O_5$, 0–6.0 percent of $Cr_2O_3$, 0–11.2 percent of $ZnO$, 0–11.5 percent of $MnO_2$, 0–10.0 percent of $MgO$, 0–10.2 percent of $Na_2O$, 0–5.0 percent of $CeO_2$, 0–5.0 percent of $ZrO_2$ and 0–10.2 percent of $Li_2O$ by weight.

DETAILED DESCRIPTION OF THE INVENTION

The present invention provides for obtaining and using coal ash for the production of poly-crystalline compositions or products and in another aspect the invention provides a process for producing same. The invention is particularly applicable to coal ash that contains large amounts of calcium oxide and transition metals such as iron manganese, chromium, titanium and the like.

As used hereinabove the term "bottom ash" or "bottom coal ash" presents itself more coarse (0.2–10 millimeters) pieces of ash which did not sweep away by smoke gases and accumulate in the bottom part of the fire box.

As used here in the specifications and in the claims section the term "fly coal ash" refers to fine solid particles of ash (5–50 $\mu$m) that are carried away by draft or by waste gases and then deposited in flues or trapped in filters or precipitation and the like. The coal ash contain organic materials and metal contaminants.

It should be noted that the term of ash or coal ash hereinabove refer to both fly ash and to bottom ash, unless one of them is stated particularly. As is exemplified in Example 6, both fly ash and bottom ash can be used to prepare the composition and articles of the invention.

In one embodiment of the present invention, there is provided a poly-crystalline composition, a poly-crystalline product and an article of manufacture comprising oxides such as $SiO_2$, $Al_2O_3$, CaO, $Fe_2O_3$, $TiO_2$, $K_2O$, $P_2O_5$, $Cr_2O_3$, ZnO, MgO, $ZrO_2$ and $MnO_2$.

The poly-crystalline products are poly-crystalline materials obtained from special glass compositions by means of catalysis crystallization and consisting from one to several crystalline mineralogical phases, uniformly distributed in the remaining glass phase. As used here in the specifications and in the claims section the term "catalysts for crystallization" refer to substances that serve as a nuclei of crystallization, such as without being limited, titanium dioxide, chromium oxide, zinc oxide, cerium dioxide manganese dioxide, and zirconium dioxide. Changing of the starting glass composition, by changing the glass forming agents or the catalyst type and quality, or the heating or cooling parameters results in glass ceramic materials with predetermined mineralogical compositions and chemical, mechanical and thermal properties.

In another embodiment of the present invention there is provided a process for producing a poly-crystalline product. The process comprises the following steps: mixing coal ash particles with at least one glass forming agent and at least one crystallization catalyst, in a mechanical blender or a pneumatic blender; b. heating in furnaces in temperature in the range of 1400° C. to 1600° C. and melting the mixture of the coal ash particles, the at least one glass forming agent and the at least one crystallization catalyst to form a mixture. This step can be carried out in a bath, pot, open hearth or electric melters; and c. cooling the resulting mixture to ambient temperature to form a homogenous, non-porous poly-crystalline product comprising $SiO_2$, $Al_2O_3$, CaO, $Fe_2O_3$, $TiO_2$, $K_2O$, $P_2O_5$, $Cr_2O_3$, ZnO, MgO, $Na_2O$, $Li_2O$, $CeO_2$, $ZrO_2$ and $MnO_2$. It should be noted in this respect that the heating, melting and cooling steps are carried out under methods and by using apparatuses that are known in the art.

The parameters of the heating and cooling are determined by type of manufactured product and are easy to perform by anyone who is skilled in the art. The cooling step can be an immediate step or a gradual step. Further examples are provided in U.S. Pat. No. 5,935,885.

In another embodiment, the at least one glass forming agent can be selected from the following oxides group: $Si_2$, $Al_2O_3$, $Li_2O$, MgO, $Na_2O$, CaO and $K_2O$. Thus, different compositions and different amounts of the glass forming agents will provide products with different colors and different textures that contain metallic contaminants. As used here in Me specifications and in the claims section the term "texture" refer to the smoothness, or the evenness or the uniformity or the glossiness of the product which may be with a glossy, silky, or polished surface or roughly, unsmoothly, bristly, unpolished, metallic, wrinkled leather surface or a granulated surface. The colors of the products can be without being limited black, light and dark green, brown, gray, silver and bronze. The color and the texture of the poly-crystalline are effected by factors like the compositions and the ratio of the different glass forming agents, the crystallization catalysts, the heating temperature, the rate of cooling as well as the atmosphere in the furnace.

In another embodiment of the present intention, the crystallization catalysts are selected from the group consisting of $TiO_2$, $Cr_2O_3$, ZnO, $CeO_2$, $MnO_2$, $ZrO_2$. The poly-crystalline composition according to the present invention further comprising by weight, 35.0–43.0 percent of $SiO_2$, 29.0–36.0 percent of $Al_2O_3$, 1.4–4.1 percent of $Fe_2O_3$, 16.0–21.0 percent of CaO, 1.3–15.2 percent of $TiO_2$, 0.6–8.9 percent of $K_2O$, 1.4–6.8 percent of $P_2O_5$, 0–6.0 percent of $Cr_2O_3$, 0–11.2 percent of ZnO, 0–1.5 percent of $MnO_2$, 0–10.0 percent of MgO, 0–10.2 percent of $Na_2O$, 0–5.0 percent of $CeO_2$, 0–5.0 percent of $ZrO_2$ and 0–10.2 percent of $Li_2O$.

In another embodiment, the poly-crystalline composition further comprising by weight of 35.0–57.0 percent of $SiO_2$, 15.0–36.0 percent of $Al_2O_3$, 1.4–10.0 percent of $Fe_2O_3$, 15.0–22.0 percent of CaO, 0.6–15.2 percent of $TiO_2$, 0.3–11.0 percent of $K_2O$, 1.4–6.8 percent of $P_2O_5$, 0–6.0 percent of $Cr_2O_3$, 0–11.2 percent of ZnO, 0–11.5 percent of $MnO_2$, 0–10.0 percent of MgO, 0–10.2 percent of $Na_2O$, 0–5.0 percent of $CeO_2$, 0–5.0 percent of $ZrO_2$ and 0–10.2 percent of $Li_2O$ by weight.

In another embodiment of the present invention, the crystallization catalysts are selected from the group consisting of $TiO_2$, $Cr_2O_3$, ZnO, $CeO_2$, $MnO_2$, $ZrO_2$. The poly-crystalline composition according to the present invention further comprising by weight, 25.0–50.0 percent of $SiO_2$, 20.0–45.0 percent of $Al_2O_3$, 0.3–6 percent of $Fe_2O_3$, 10–30.0 percent of CaO, 0.3–24.0 percent of $TiO_2$, 0.2–15 percent of $K_2O$, 0.3–13 percent of $P_2O_5$, 0–6 percent of $Cr_2O_3$, 0–20 percent of ZnO, 0–6 percent of $MnO_2$, 0–19.0 percent of MgO, 0–19.0 percent of $Na_2O$, 0–9.0 percent of $CeO_2$, 0–9.0 percent of $ZrO_2$ and 0–19.0 percent of $Li_2O$.

The invented utilization of coal ash for obtaining glass-crystalline materials, (glass-ceramics) provides an example for a technical solution, which utilizes considerable quantities of coal ash for obtaining a new class of materials with improved physical and decoration characteristics in comparison to other materials which currently exist in the market.

Different physical characteristics, such as for example, strength, hardness, thermal resistant and wear resistance distinguish the product and the composition of the present invention from other products and compositions that were described before. As is exemplified in the examples section, there is provided an embodiment of changing the product physical characteristics by adding different glass forming agents and by changing the heating and cooling conditions. Thus, it is possible to provide a product which will suit the applications requirements.

In one embodiment, there is provided a non-porous poly-crystalline composition. In another embodiment the porosity index is in the range of 0.3–0.7% and is about 0.5%. Thus, the invention provides compositions and products that have no water absorption are gas impermeable and also have low thermal conductivity.

In another embodiment the density of the poly-crystalline composition is in the range of $2.5*10^3$ to $2.9*10^3 kg/m^3$.

The product and composition have strong thermal resistance, whereas in one embodiment, the initial temperature of softening is about 1200° C.

As used herein in the specification and in the claims section below the term "about" refers to ±20%

As is exemplified in the Examples section, the present invention compositions and products, have a similar stochiometric ratio to poly-crystalline structures that exist in nature. These are for example, without being limited, anorthite crystalline, cordierite crystalline, wollastonite crystalline, lithium disilicate crystalline and chromium oxide crystalline.

The described process of production enables to manufacture glass-ceramic facing plates, which are of uniform quality.

Assessment of the products that were produced according to the processes and the starting materials described in the Examples section revealed the following data:

These materials are better than the building ceramic concerning the porosity index (~0.5%) but much lower than the practically un-porous glass ceramics (porosity <0.02%). Thermal Coefficient of Linear Expansion is changed within relatively narrow limits $(80–100)*10^{-7}1/°$ C. that corresponds to the building ceramic, whereas for the usual glass ceramics the range of this parameter is wider from 20 to $120*10^{-7}1/°$ C.

Careful assessment of the materials microstructure by electron microscope (Holon Academic Institute of Technology, Israel) showed dense glass ceramic structure with crystal dimensions ~1 mkm. Determination of the mineralogical composition the products of Example 1 by X-ray diffraction (The Ministry of National Infrastructures, Geological Survey, Israel ) revealed that the predominant crystalline phase is anorthite whereas the additional crystalline phase is albite.

Thermal Coefficient of Linear Expansion the glass ceramics (assessed by Israeli Institute of Ceramic and Silicates, Ben-Gurion University of Negev, Israel) was found to be up to $52*10^{-7}1/°$ C. The glass density was found to be up to $2.72*10^3$ $kg/m^3$; the porosity less 0.02%; bending strength was up to 150 MPa; temperature strength under load was 1100° C. Other mechanical characteristics were performed in Holon Academic Institute of Technology, Israel: micro-hardness HV (Vickers) up to 8.2 GPa, wear resistance five times more than the customary building ceramic. Adhesion in the stick on to the concrete (Standard Institute of Israel) was 1.5–4.0 times (in dependence on the glue) more than the standard requirements. Discharge of radon $Rn^{222}$ was lower than the sensitivity level of the control-measuring instruments (Nahal Soreq Nuclear Center, Israel). The level of radioactive emission of the product (Nahal Soreg Nuclear Center, Ministry of the Environment, Radiation Safety Division, Israel) was 22 fold less than the permissible level. The glass ceramics products were found to be water-resistant and were stable to acids and alkali effects.

The proposed glass ceramics correspond to Thermal Coefficient of Linear Expansion (T.C.L.E) of wolfram (T.C.L.E of wolframe $43*10^{-7}1/°$ C. is near to T.C.L.E of glass ceramic. It allows to introduce them in wolfram fast elements needed in cases when usual sticking is not possible or is dangerous.

Thus, the present invention is directed to an efficient process of utilization of coal ash, which result from municipal waste. The resulted products and compositions are of a high quality, nice and interesting appearance and colors, and have superior physical properties such as compressive strength, bending strength, impact strength, low thermal conductivity.

Moreover, the process of the present invention is a low cost process that does not required additional preparation (such as grinding, purification, concentration and the like).

As is exemplified in the Examples Section, the invention provides methods for producing glass ceramics and marble like glasses, which are made from fly coal ash as well as bottom ash from any part of the world. Example 1–6 relates to coal ash obtained from South Africa, whereas Example 7 and 8 relates respectively to coal ash obtained from USA to a mixed coal derived from Australia and Asia.

By practicing the inventive process and products, ready to use products are provided such as, for example without being limited, articles for house construction, granite, ceramic tiles for internal or external walls and for floor lining. Also, the developed products can be widely used in civil- and industry engineering for lining of different chutes, tubes, boxes, trays, bins and trestles in the food, chemical, mining and other industry fastening elements, coatings, high-voltage insulators, hermetic containers for storage of radioactive waste, parts of pumps, heat exchangers, heat resistant parts, corrosion resistant parts, as antiballistic and the rest.

It will be appreciated that the present invention is not limited by what has been described hereinabove and that numerous modifications, all of which fall within the scope of the present invention, exist. For example, while the present invention has been described with respect to the Examples section, which provides the above described compositions, it will be appreciated by persons skilled in the art that the present invention is not limited by what has been particularly shown and described herein above. It is to be understood that other close compositions and agents comprising other ratios and other components can be effectively employed in the present invention process, products and compositions.

EXAMPLES

The present invention relates to the production of glass ceramics and marble-like glasses from coal ash In all of the following examples different compositions of coal ash were mixed with glass-forming agents such as for example $SiO_2$, $Al_2O_3$, $Li_2O$, MgO, $Na_2O$, CaO, $K_2O$ and catalysts of crystallization such as $TiO_2$, $Cr_2O_3$, ZnO, $CeO_2$, $MnO_2$ and $ZrO_2$. The substances were than heated and melted in furnaces and than cooled to ambient temperature. The different compositions of the glass forming agents, the different catalysts of crystallizaton and different heating and cooling conditions resulted in different colors and different textures of the glass products.

The process of the glass manufacturing included the step of heating the materials in furnaces: At the preliminary stage (before mixing with other glass-forming materials) the coal-ash was thermally heated at a temperature in the range of 650–700° C. for 2–10 hours for burning out coal remainders that might influence the furnace atmosphere; exposure to the same temperature in the heat process during the glass cooking (after mixing the ash with the other raw materials) provides additional regulation of the furnace atmosphere through incorporation of raw materials in the form of salts that discharge the furnace atmosphere with gases. The atmosphere is also changed by replacing carbonates by nitrates or by a direct introduction of gases (oxygen, nitrogen, carbon dioxide) to the furnace atmosphere;

All of the following examples were based on Ash I and Ash II that have the following compositions in weight percents:

TABLE 1

| Ingredient | *Coal ash I (South Africa) | *Coal ash II (South Africa) |
|---|---|---|
| $SiO_2$ | 44.9 | 46.0 |
| $Al_2O_3$ | 32.3 | 32.4 |
| $Fe_2O_3$ | 4.5 | 1.8 |
| CaO | 6.9 | 11.2 |
| $TiO_2$ | 1.9 | 1.8 |
| $K_2O$ | 0.8 | 0.8 |
| $P_2O_5$ | 3.1 | 1.9 |
| Coal | 5.6 | 4.1 |

*coal ash I and coal ash II stand for different samples taken from ash coal.

Example 1

Production of Anorthite Glass Ceramic on the Basis of Fly Coal Ash

The following process was used to produce an anorthite glass ceramic product: Anorthite (which is composed mainly of $CaO* Al_2O_3*2 SiO_2$) is related to a class of silicate of the frame structure type. The density of crystals is $(2.74–2.76)*10^3$ kg/m$^3$; the melting temperature is 1550° C.; Thermal Coefficient of Linear Expansion is $40*10^{-7}$/° C.; the dielectric constant is 6.9 and the hardness (Mohs scale) is 6.0–6.5.

Ash I and Ash II were used (see table 1). The stoichiometric mass ratio of the oxides CaO, $Al_2O_3$ and $SiO_2$ in the anorthite is 1.0:1.8:2.1 respectively. The resulting stoichiometry of the product made with ash I was found to be 1.0:4.7:6.5 and with ash II 1.0:2.9:4.1, respectively. Thus, In order to improve the composition, calcium carbonate ($CaCO_3$) and technical alumina ($Al_2O_3$) were added. The catalysts of crystallization that were used in this process were $TiO_2$, $Cr_2O_3$, $P_2O_5$, followed by administration phosphoric acid potassium. The resulted composition in weight percent was as follow:

$SiO_2$ 35.0–43.0; $Al_2O_3$ 29.0–36.0; $Fe_2O_3$ 1.4–4.1; CaO 16.0–21.0; $TiO_2$ 1.3–15.2; $K_2O$ 0.6–8.9; $P_2O_5$ 1.4–6.8; $Cr_2O_3$ 0–1.5, ZnO 0–112, $MnO_2$ 0–1.5.

Glass cooking was carried out in an electrical furnace at 1480–1550° C. in quartz or alumina crucibles.

The following glass products were obtained: a. colored glass ceramics of black, light- and dark- green, dark- and light gray colors with a shining frosted surface; b. colored marble-like glasses of intensive black, light- and dark-green, light- and dark-brown colors with decorative surface patterns; and c. glass ceramics with different surfaces e.g. "metallize" surface, "wrinkled leather" effect and an uneven painting of which has a light colors in the center that becomes gradually darker on the outlying area Example 2

Production of Cordierite Glass Ceramic on the Basis of Fly Coal Ash

The following process was used to produce a cordierite glass ceramic on the basis of fly coal ash. Cordierite (which is composed mainly of $2MgO*2Al_2O_3*5SiO_2$) relates to a class silicates of circular structure type. The crystals density is $2.53*10^3$ kg/m$^3$, the melting temperature is 1470° C., Thermal Coefficient of Linear Expansion is $26*10^{-7}$/° C., the dielectric constant is 7 and the hardness on the Mohs scale is 7–7.5.

Ashes I and II (see Table 1) have been used. The stoichiometric mass ratio of oxides $MgO:Al_2O_3:SiO_2$ in cordierite is 1.0:2.6:3.8. The ratio of $Al_2O_3:SiO_2$ in cordierite is 1.0:1.5. The ratio of $Al_2O_3:SiO_2$ in the ashes I and II approximately corresponds to cordierite without MgO. Thus, for improving the composition, magnesium salts were added. The following catalysts of crystallization were used either separately or in combinations: titanium dioxide, chromium oxide and zinc oxide. The resulting composition (mas. %) was:

$SiO_2$ 30.0–38.0; $Al_2O_3$ 20.0–25.0; $Fe_2O_3$ 1.5–4.4; CaO 6.0–10.0;

MgO 8.0–10.0; $TiO_2$ 1.1–11.2; $K_2O$ 0.6–1.0; $P_2O_5$ 1.4–3.0;

$Cr_2O_3$ 0–2.0, ZnO 0–9.0.

The products obtained were: a. colored glass ceramics of black the light- and dark brown; b. colors with a shining and non glossy surface; and c. colored marble-like of intensity black color.

Example 3

Production of Wollasonite Glass Ceramic on the Basis of Fly Coal Ash

The following process was performed for obtaining of wollastonite glass ceramic on the basis of fly coal ash.

Wollastonite $CaO*SiO_2$ relates to the silicate class of chain type. The crystals density is $2.928*10^{-3}$ kg/m$^3$; the melt temperature is 1540° C.; TCLE $94*10^{-7\ is}$ 1/° C.; the dielectic constant is 6.2; and the hardness according to Mohs scale is 4.0–4.5.

Ashes I and II (see Table 1) have been used. The stoichiometric mass ratio of oxides $CaO:SiO_2$ in the wollastonite is 1.0:1.1. The stoichiometric mass ratio of the oxides $CaO:SiO_2$ obtained with ash I was 1.0:6.5; and in ash II 1.0:4.1, respectively. Thus, for improving the composition calcium salts were added. The catalysts of crystallization that were used either separately or in combination were titanium dioxide, chromium oxide and zinc oxide. The total composition (mas. %) is:

$SiO_2$ 38.0–43.0; $Al_2O_3$ 20.0–27.0; $Fe_2O_3$ 1.3–3.2; CaO 28.0–34.0; $TiO_2$ 1.1–8.6; $K_2O$ 0.6–1.0; $P_2O_5$ 1.4–3.0; $Cr_2O_3$ 0–2.0, ZnO 0

The resulting product was a colored light gray and dark brown glass ceramic with non glossy surface.

Example 4

Production of Glass Ceramic with Lithium Disilicate as the Main Crystalline Phase on the Basis of Fly Coal Ash Lithium disilicate $Li_2O*2SiO_2$ relates to a class of silicate. The crystals density is $2.45*10^3$ kg/m$^3$, the melting temperature is 1032° C. and TCLE is $110*10^{-7}$ 1/° C. Ashes I and II (table 1) were used. For improving the composition lithium salts were added to the ashes. Titanium dioxide $TiO_2$ and cromium oxide $Cr_2O_3$ were used as catalysts of crystallization (either separately or in combination). The final composition was (mass. %):

$SiO_2$ 34.0–43.0; $Al_2O_3$ 24.0–30.0; $Fe_2O_3$ 1.3–3.5; CaO 5.4–10.3; $TiO_2$ 1.4–17.1; $K_2O$ 0.6–1.0; $P_2O_5$ 1.4–2.9; $Cr_2O_3$ 0–2.0; and $Li_2O$ 0–10.2.

The following products were obtained: a. colored glass ceramics in gray and brown colors with a shining and non glossy surface; b. colored gray glass ceramic with a silvery, bronze and light brown surface; c. colored dark brown glass ceramic with a light-brown surface.

Example 5

Production of Black Marble-like Glasses with Aventurine Effect on the Basis of Fly Coal Ash Ashes I and II (see Table 1) were used in combination of other raw materials: $SiO_2$, CaO, $K_2O$, $Na_2O$ and $Cr_2O_3$: The following composition (mass. %) was obtained:

$SiO_2$ 49.0–55.0; $Al_2O_3$ 7.0–10.0; $Fe_2O_3$ 0.6–2.0; CaO 18.0–24.0;

$TiO_2$ 0.4–0.7; $K_2O$ 5.0–7.0; $P_2O_5$ 0.4–1.0; $Cr_2O_3$ 4.0–6.0; $Na_2O$ 0–10.2.

The glasses were heated in the electrical race at the temperature rage of 1480–1550° C. for 2–6 hours in quartz or alumina crucibles. Aventure-forming was performed at temperature in the range of 1150–1400° C. for 2–12 hours.

The resulted marble-like glasses had a decorative effect in which the crystals of $Cr_2O_3$ were uniformly distributed all over (aventurine effect).

Example 6

Manufacture of Glass Ceramic and Marble-like Glasses on the Base of Coal Bottom Ash The following example demonstartes the applicability of the process for producing glasss cermic and able like glasses from fly coal ash as well as from bottom coal ash.

For manufacture of glass ceramics and marble-like glasses, coal bottom ash have been used, in a composition that was similar to the compositions of coal fly ash presented in table 1. Composition of materials and technological parameters of manufacture process were correspond to description in examples 1, 2, 3, 4 and 5.

The resulting glass ceramics and marble-like glasses did not differ from the above mentioned resulted compositions and srticles that were based on coal fly ash.

Example 7

Utilization of Coal Ashes from Different Sources for Optimization of Glass Ceramic Composition In some cases the coal from a particular source is different either by deficiency or by excessive content of components needed for glass ceramic synthesis. The optimization of compositions of such coal ash by introduction of considerable amount of additional raw materials is not reasonable. A better method is to use coal ashes from another source. The following is an example for glass ceramic obtained from coal ashes obtained from USA deposit.

TABLE 2

| Components | 1. Ash I | 2. Ash II | Mixture of two ashes |
|---|---|---|---|
| $SiO_2$ | 56.4 | 34.4 | 45.4 |
| $Al_2O_3$ | 26.9 | 16.1 | 21.5 |
| $Fe_2O_3$ | 5.5 | 11.5 | 8.5 |

TABLE 2-continued

| Components | 1. Ash I | 2. Ash II | Mixture of two ashes |
|---|---|---|---|
| CaO | 1.9 | 27.5 | 14.7 |
| $TiO_2$ | 2.1 | 1.2 | 1.7 |
| $K_2O$ | 2.9 | 1.1 | 2.0 |
| $SO_3$ | 0.3 | 1.7 | 1.0 |
| $P_2O_5$ | 0.2 | 1.8 | 1.0 |
| Coal | 3.8 | 4.7 | 4.2 |

As it seen from table 2, ash I differs by higher content of $SiO_2$, $Al_2O_3$ and lower content of CaO whereas in ash II the opposite is observed. In addition, in ash II the content of $Fe_2O_3$ is extremly high and it is more complicate to obtain glass ceramics of light tones. The mixing of I and II ashes in a ratio of 1:1 enables balancing of the content of main components.

After the mixing of the ashes from the different sources calcium carbonate, $CaCO_3$ has been added. For the catalysis of crystallization, the following have been added separately or in combination: titanium dioxide ($TiO_2$), chromium oxide ($Cr_2O_3$) and zinc oxide (ZnO). The total composition of materials (mass. %): $SiO_2$ 32.0–41.0; $Al_2O_3$ 16.0–20.0; $Fe_2O_3$ 5.4–8.0; CaO 16.0–28.0; $TiO_2$ 1.4–10.0; $K_2O$ 1.4–1.8; $P_2O_5$ 0.6–0.8; $Cr_2O_3$ 0–1.5; ZnO 0–7.7.

Following materials have been obtained: painted in mass glass ceramics of light gray, light and dark brown, light and dark green colors with shining and mat surfaces.

Example 8

Manufacture of Glass Ceramics and Marble-like Glasses on the Base of Coal Ashes of Asian and Australian Deposits For manufacture of glass ceramics and marble-like glasses the coal ashes of Asian and Australian deposits have been used in composition of which are presented in table 3. As it shown from table 3, above mentioned compositions are characterized by low content of calcium oxide CaO and required addition calcium carbonate ($CaCO_3$).

For the catalysis of crystallization the following oxides were used either separately or in combination: titanium dioxide ($TiO_2$), chrome oxide ($Cr_2O_3$), zinc oxide (ZnO), manganese oxide ($MnO_2$) and zinc sulfide (ZnS). The resulting composition comprises: $SiO_2$ 40.2–56,7; $Al_2O_3$ 16.2–28.3; $Fe_2O_3$ 2–9.4; CaO 16.6–22.8; MgO 0.3–0.8; $TiO_2$ 0.8–10.2; $K_2O$ 0.4–2.3; $Na_2O$ 0.2–0.3; $P_2O_5$ 0.2–1.5; $Cr_2O_3$ 0–1.5; ZnO 0–11.2; ZnS 0–5.6; $MnO_2$ 0–1.5.

TABLE 3

| Components | Content, mass. % |
|---|---|
| $SiO_2$ | 50.2–70.9 |
| $Al_2O_3$ | 20.2–35.4 |
| $Fe_2O_3$ | 4.0–11.7 |
| CaO | 0.6–2.8 |
| MgO | 0.4–1.0 |
| $TiO_2$ | 1.0–1.4 |
| $K_2O$ | 0.6–2.9 |
| $Na_2O$ | 0.2–0.5 |
| $SO_3$ | 0.2–2.6 |
| $P_2O_5$ | 0.2–1.8 |

Technological operations are similar to those described in example 1.

Following materials have been obtained: painted mass glass ceramics and marble-like glasses in light gray, light and dark brown, light and dark green, yellow and creme colors with shining and mat surface.

References

Overview of Coal Combustion Products (CCPs) and the American Coal Ash Association (ACAA) by Samuel S. Tyson, P.E., Executive Director ACAA for National Coal Ash Board, Tel-Aviv, Israel, Jul. 19–20, 2000.

P. W. McMillan, Glass Ceramics, 2$^{nd}$ Ed. (Academic Press, London, 1979).

A. I. Berezhnoi, Glass Ceramics and Photositalls (Plenum, N.Y., 1970).

Glasses and Glass-Ceramics, ed. M. H. Lewis (Chapman and Hall, London, 1989).

High Performance Glasses, ed. M. Cable and J. M. Parker (Blackie, Glasgow, 1992).

P. F. James, Glass ceramics: new compositions and uses, J. Non-Cryst. Solids 181 (1995) 1–15.

What is claimed is:

1. A solid composition comprising:
between about 25.0% and about 57.0% by weight $SiO_2$;
between about 29.0% and about 45.0% by weight $Al_2O_3$;
between about 0.3% and about 10% by weight $Fe_2O_3$;
between about 5.4% and about 34.0% by weight CaO;
between about 0.6% and about 24.0% by weight $TiO_2$;
between about 0.2% and about 15.0% by weight $K_2O$; and
between about 0.3% and about 13.0% by weight $P_2O_5$
wherein the composition is ceramic.

2. The composition of claim 1 comprising at least about 35.0% by weight $SiO_2$.

3. The composition of claim 1 comprising less than about 50.0% by weight $SiO_2$.

4. The composition of claim 1 comprising at least about 30.0% by weight $Al_2O_3$.

5. The composition of claim 1 comprising less than about 3 6.0% by weight $Al_2O_3$.

6. The composition of claim 1 comprising at least about 1.4% by weight $Fe_2O_3$.

7. The composition of claim 1 comprising less than about 6.0% by weight $Fe_2O_3$.

8. The composition of claim 1 comprising at least about 10.0% by weight CaO.

9. The composition of claim 1 comprising less than about 30.0% by weight CaO.

10. The composition of claim 1 comprising at least about 1.3% by weight $TiO_2$.

11. The composition of claim 1 comprising less than about 15.2% by weight $TiO_2$.

12. The composition of claim 1 comprising at least about 0.3% by weight $K_2O$.

13. The composition of claim 1 comprising less than about 11% by weight $K_2O$.

14. The composition of claim 1 comprising at least about 1.4% by weight $P_2O_5$.

15. The composition of claim 1 comprising less than about 6.8% by weight $P_2O_5$.

16. An article of manufacture comprising a ceramic, said ceramic including
between about 25.0% and about 57.0% by weight $SiO_2$;
between about 29.0% and about 45.0% by weight $Al_2O_3$;
between about 0.3% and about 10% by weight $Fe_2O_3$;
between about 5.4% and about 34.0% by weight CaO;
between about 0.6% and about 24.0% by weight $TiO_2$;
between about 0.2% and about 15.0% by weight $K_2O$; and
between about 0.3% and about 13.0% by weight $P_2O_5$.

17. The article of claim 16 comprising greater than about 35.0% by weight $SiO_2$.

18. The article of claim 16 comprising less than about 50.0% by weight $SiO_2$.

19. The article of claim 16 comprising greater than about 30.0% by weight $Al_2O_3$.

20. The article of claim 16 comprising less than about 36.0% by weight $Al_2O_3$.

21. The article of claim 16 comprising greater than about 1.4% by weight $Fe_2O_3$.

22. The article of claim 16 comprising less than about 6.0% by weight $Fe_2O_3$.

23. The article of claim 16 comprising greater than about 10.0% by weight CaO.

24. The article of claim 16 comprising less than about 30.0% by weight CaO.

25. The article of claim 16 comprising greater than about 1.3% by weight $TiO_2$.

26. The article of claim 16 comprising less than about 15.2% by weight $TiO_2$.

27. The article of claim 16 comprising greater than about 0.3% by weight $K_2O$.

28. The article of claim 16 comprising less than about 11% by weight $K_2O$.

29. The article of claim 16 comprising greater than about 1.4% by weight $P_2O_5$.

30. The article of claim 16 comprising less than about 6.8% by weight $P_2O_5$.

31. A solid composition comprising a plurality of oxides, said oxides selected from the group consisting essentially of group II oxides, group III oxides, group IV oxides, group V oxides and lanthanoid oxides and having
between about 25.0% and about 57.0% by weight $SiO_2$;
between about 24.0% and about 45.0% by weight $Al_2O_3$;
between about 0.3% and about 10% by weight $Fe_2O_3$;
between about 5.4% and about 34.0% by weight CaO;
between about 0.6% and about 24.0% by weight $TiO_2$;
between about 0.2% and about 15.0% by weight $K_2O$; and
between about 0.3% and about 13.0% by weight $P_2O_5$
wherein the composition is ceramic and substantially devoid of ZnO.

32. An article of manufacture comprising the ceramic of claim 31.

33. A solid composition comprising:
between about 25.0% and about 5 7.0% by weight $SiO_2$;
between about 24.0% and about 45.0% by weight $Al_2O_3$;
between about 0.3% and about 10% by weight $Fe_2O_3$;
between about 28.0% and about 34.0% by weight CaO;
between about 0.6% and about 24.0% by weight $TiO_2$;
between about 0.2% and about 15.0% by weight $K_2O$; and
between about 0.3% and about 13.0% by weight $P_2O_5$
wherein the composition is ceramic.

34. An article of manufacture comprising the ceramic of claim 33.

* * * * *